United States Patent [19]

Nagasaka

[11] Patent Number: 4,703,297

[45] Date of Patent: Oct. 27, 1987

[54] PERMANENT MAGNET TYPE LINEAR ELECTROMAGNETIC ACTUATOR

[75] Inventor: Nagahiko Nagasaka, Iruma, Japan

[73] Assignee: Kabushiki Kaisha Yaskawa Denki Seisakusho, Japan

[21] Appl. No.: 942,464

[22] Filed: Dec. 16, 1986

[30] Foreign Application Priority Data

Feb. 18, 1986 [JP] Japan .................................. 61-33589

[51] Int. Cl.⁴ .............................................. H01F 7/08
[52] U.S. Cl. .................................... 335/222; 335/229
[58] Field of Search ................ 335/222, 223, 229, 231

[56] References Cited

U.S. PATENT DOCUMENTS 3,169,550  2/1965  Reader ............................ 335/223 X
4,602,232  7/1986  Umehara et al. .................... 335/222

OTHER PUBLICATIONS

IBM Technical Disclosure Bulletin, Linear Actuator, vol. 15, No. 3, Aug., 1972, p. 917.

Primary Examiner—George Harris
Attorney, Agent, or Firm—Beveridge, DeGrandi & Weilacher

[57] ABSTRACT

In the permanent magnet type actuator, an armature made of a hollow cylindrical permanent magnet is held to be movable in its axial direction. A stator made of an electromagnet comprises a magnet core having two portions one placed outside of the permanent magnet and the other placed inside of the same, thereby applying a unipolar magnetic field to the armature. A plurality of inductor teeth are formed on the surfaces of the core portions opposing to each other, and means are further provided for energizing a coil of the electromagnet by an exciting current and driving the armature in its axial direction.

3 Claims, 8 Drawing Figures

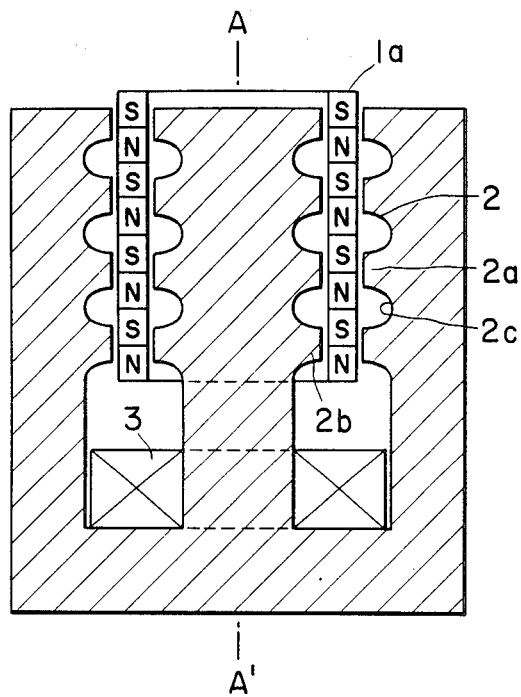
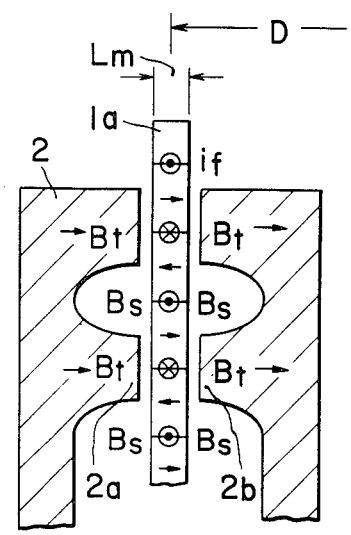
FIG. 1 (a)
FIG. 1 (b)
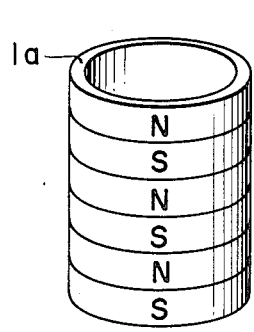
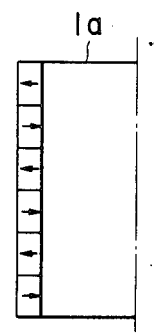
FIG. 2 (a)
FIG. 2 (b)

PERMANENT MAGNET TYPE LINEAR ELECTROMAGNETIC ACTUATOR

BACKGROUND OF THE INVENTION

This invention relates to an electromagnetic actuator utilizing a permanent magnet formed into a hollow cylindrical configuration having a thin wall and driven in its axial direction under application of a unipolar magnetic field.

Heretofore, a voice coil type actuator used in a dynamic speaker has been widely known as an example of the aforementioned actuator.

However, the driving force of the actuator which is otherwise termed a voice coil motor is expressed as follows:

$$B_f \cdot l \cdot i_a$$

wherein:

$B_f$ represents a magnetic field applied to the moving coil, l represents an effective length of the moving coil, and $i_a$ represents an electric current flowing through the moving coil.

In order to increase the driving force of the moving coil having a predetermined effective length l, either one of the electric current $i_a$ and the magnetic field $B_f$ must be increased. Since an increase in the electric current $i_a$ entails an increase in the cross-sectional area of the conductor, and any attempt intensifying the magnetic field $B_f$ inevitably increases the size of the permanent magnet, the driving force of the conventional voice coil type actuator has been restricted to a comparatively small value.

SUMMARY OF THE INVENTION

A primary object of the invention is to provide a permanent magnet type linear electromagnetic actuator wherein the aforementioned drawback of the conventional actuator can be substantially eliminated.

A more specific object of the invention is to provide a permanent magnet type linear electromagnetic actuator, the driving force of which is far greater than that of the conventional actuator.

Another object of the invention is to provide a permanent magnet type linear electromagnetic actuator the size and weight which can be substantially reduced compared with those of the conventional actuator.

Still another object of the invention is to provide a permanent magnet type linear electromagnetic actuator which is adapted for a minute adjustment in focusing lens and the like purposes.

These and other objects of the invention can be achieved by a permanent magnet type linear electromagnetic actuator comprising an armature made of a permanent magnet of a hollow cylindrical configuration and held movable in its axial direction, a stator made of an electromagnet having a magnet core formed into two portions which are placed outside and inside of the hollow cylindrical permanent magnet so as to apply a unipolar magnetic field therethrough, a plurality of inductor teeth formed at a pitch along each of the surfaces of the core portions opposing outwardly and inwardly to the permanent magnet through air gaps, and means for applying an exciting current to a coil wound around the magnet core of the electromagnet.

The permanent magnet of a hollow cylindrical shape constituting the armature is magnetized into N-poles and S-poles alternately along its axial direction at a predetermined pitch, the direction of magnetization of these poles being disposed radially, while the inductor teeth of the armature are formed along the opposing surfaces of the magnet core portions at a pitch equal to the aforementioned pitch of the pole pairs of the permanent magnet.

Alternatively, the permanent magnet of the armature is magnetized into N-poles and S-poles alternately along its axial direction at a predetermined pitch as in the above described case, while the two sets of the induction teeth provided along the opposing surfaces of the outer and inner portions of the magnetic core of the armature are formed at a pitch equal to the pitch of the pole pairs of the permanent magnet, but at positions displaced from each other by one half of the predetermined pitch.

BRIEF DESCRIPTION OF THE DRAWINGS

In the accompanying drawings:

FIG. 1(a) is a sectional view showing a preferred embodiment of the invention;

FIG. 1(b) is a diagram to be used to explaining the operational principle of the embodiment;

FIG. 2(a) is a perspective view showing an armature made of a permanent magnet;

FIG. 2(b) is a sectional view showing one part of the armature for indicating magnetizing directions of the pole pairs;

DESCRIPTION OF THE PREFERRED EMBODIMENTS

Figure 3:
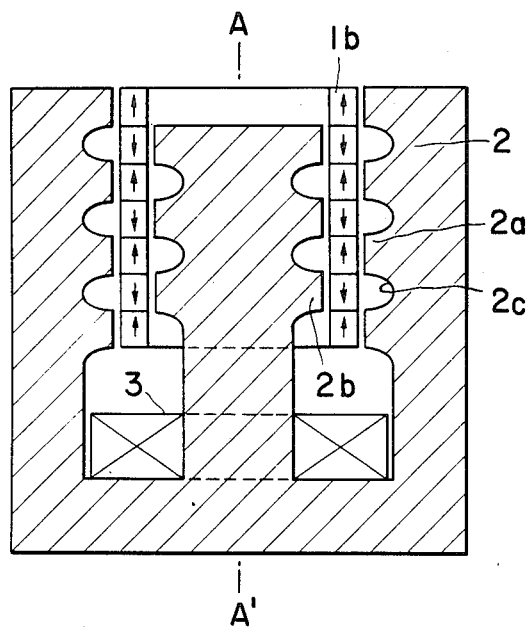
FIG. 3(a) is a sectional view showing another embodiment of the invention.
FIG. 3(b) is a diagram for explaining the operational principle of the embodiment shown in FIG. 3(a)
Figure 3:
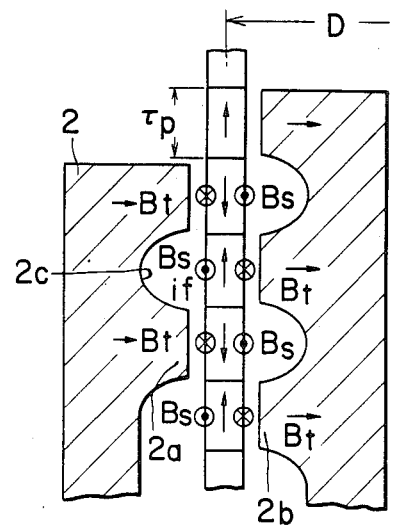

A preferred embodiment of the invention will now be described with reference to FIGS. 1(a), 1(b), 2(a) and 2(b). In the shown embodiment, an armature of this actuator is made of a permanent magnet 1a of a hollow cylindrical or sheath-like configuration having a comparatively thin thickness, which is supported to be movable only in the direction of its longitudinal axis A—A'. The permanent magnet 1a is magnetized to provide N-poles and S-poles alternately arranged at a predetermined pitch along the axis A—A' as shown in FIGS. 1(a) and 2(a), while the direction of the magnetization is disposed radially as indicated by arrows in FIG. 2(b).

On the other hand, a stator of this embodiment is made of an electromagnet comprising a magnet core 2 and a coil 3. The magnet core 2 is constructed to provide an E-shaped cross-section as shown in FIG. 1(a). The cylindrical permanent magnet 1a forming the armature is placed in a space between an outer annular portion and inner columnar portion of the E-shaped cross-sectional configuration of the magnet core 2 such that the outer and inner surfaces of the permanent magnet 1a oppose the pole-forming surfaces of the two portions, respectively, and a unipolar magnetic field is applied from the magnet core 2 to the permanent magnet 1a through air gaps formed inside and outside of the permanent magnet 1a. A plurality of inductor teeth 2a and 2b are formed on the pole-forming surfaces of the outer and inner portions of the magnet core 2, respectively, at a pitch equal to the pitch of the pole pairs of the permanent magnet 1a. The armature 1a is driven in its axial direction when an AC current is caused to flow through the coil 3 of the stator electromagnet.

More specifically, upon energization of the coil 3, a magnetic field $B_l$ is produced in a part of the air gaps defined between the opposing teeth 2a and 2b, and another magnetic field $B_s$ is produced in a part of the air gaps defined between valley portions 2c. When the pole pairs of the permanent magnet 1a are represented equivalently by a current $i_f$ following therethrough, a driving force F derived from each pole pair of the permanent magnet 1a for driving the armature in its axial direction is expressed as follows.

$$F = (B_l - B_s) i_f l \quad (1)$$

wherein:
l represents a circumferential length $\pi D$ of the permanent magnet 1a.

When it is assumed that $L_m$ represents the thickness of the permanent magnet 1a, and $H_c$ represents a coercive force of the permanent magnet 1a, the aforementioned equivalent current $i_f$ is expressed as follows.

$$i_f = 2 H_c L_m \quad (2)$$

FIG. 3(a) illustrates another embodiment of the invention, and FIG. 3(b) is a diagram for explaining the principle of operation of this embodiment.

In the embodiment shown in FIG. 3(a), a permanent magnet 1b similar to the permanent magnet 1a in the previous embodiment is held to be movable in the axial direction A—A', and a plurality of pole pairs are formed in the direction A—A' at a predetermined pitch $\tau_p$. Furthermore, a magnet core 2 of the stator of this embodiment is constructed in a similar manner as in the previous embodiment except that the inductor teeth 2a and 2b provided on the outer and inner portions of the magnet core 2 are axially displaced from each other by one half of the predetermined pitch $\tau_p$ of the pole pitch (not pole pair pitch).

In this embodiment, the driving force F is also expressed by the equation (1), while the equivalent exciting current $i_f$ is expressed as $$i_f = \tau_p H_c \quad (3)$$

Figure 4:
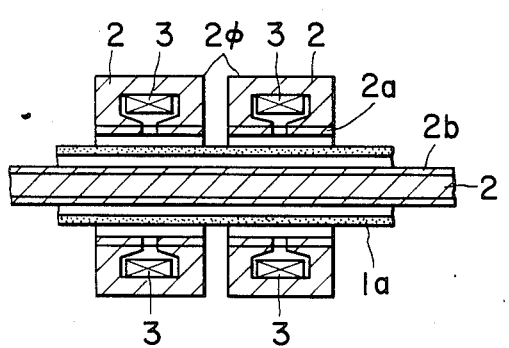
FIGS. 4 and 5 are sectional views showing further different embodiments of the invention.
Figure 5:
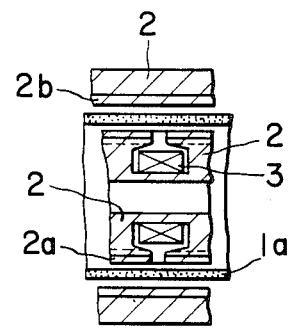

FIGS. 4 and 5 illustrate further embodiments of the present invention.

In the embodiment shown in FIGS. 1(a) and 3(a), the stroke (or operational range) of the armature has been restricted to the predetermined one pitch $\tau_p$ of the pole pair, and when it is desired to increase the operation range of the actuator, two or more phases of electromagnets must be utilized. The embodiment shown in FIG. 4 is constructed to satisfy such a requirement.

In all of the embodiments so far described, the axial length thereof has been comparatively large. Such a disadvantage can be eliminated by use of a construction corresponding to one phase electromagnet of FIG. 4.

Furthermore, a construction as shown in FIG. 5 in which the coil 3 of the electromagnet is placed within the cylindrical permanent magnet 1a may also be utilized as still another embodiment of the invention.

Although the invention has been described with respect to a radially magnetized construction of the permanent magnet, it is apparent that the magnetization may otherwise be effected in an axial direction of the permanent magnet.

The linear actuator according to this invention exhibits following advantageous features.

(1) A tangential force of 1 Kgf/cm$^2$ can be produced by the actuator of this invention. Thus when the thickness and the specific gravity of the armature are assumed to be 1 mm and 10 gr/cm$^3$ respectively, the actuator can drive a 1 gr mass with 1 Kgf force thus realizing a large acceleration of approximately 1000 g.

In the case of the conventional voice-coil type actuator, when a current density of 10 A/mm$^2$ and an air-gap field intensity of 1 Tesla are assumed, a tangential force of merely 0.1 Kgf/cm$^2$ and hence an acceleration of approximately 1/10 of the present invention could be obtained. Thus it is apparent that the actuator of this invention can provide an output ten-times larger than the conventional actuator.

(2) When the invention is directed to the provision of an actuator of a reduced size and weight, a minute displacement linear actuator of a small size and light weight can be realized, thus being applicable to wide fields of techniques such as focusing of lens provided in the head of laser disk or CD player and a tracking-use servo-actuator.

(3) The actuator of this invention may otherwise be utilized in the fields of directly driving hydraulic servo valves and suction and exhaust valves for various engines, thus being far advantageous than the conventional helical solenoid type actuator. More specifically, it is apparent that the permanent magnet type actuator of this invention utilizing a rare earth material is more advantageous than the variable reactance type actuator.

What is claimed is:

1. A permanent magnet type linear electromagnetic actuator comprising:
   an armature made of a permanent magnet of a hollow cylindrical configuration and held movable in its axial direction;
   a stator made of an electro-magnet having a magnet core formed into two portions which are placed outside and inside of said hollow cylindrical permanent magnet so as to apply a unipolar magnetic field therethrough;
   a plurality of inductor teeth formed at a pitch along said of the surfaces of said core portions opposing outwardly and inwardly to said permanent magnet through air gaps; and
   means for applying an exciting current to a coil wound around said magnetic core of said electromagnet.

2. The permanent magnet type linear actuator according to claim 1 wherein said permanent magnet of said armature is magnetized so as to provide N-poles and S-poles alternately along the axis of the permanent magnet at a predetermined pitch, the direction of magnetization being disposed radially of said permanent magnet, and said inductor teeth are provided on the surfaces of said core portions at a pitch equal to the predetermined pitch of the pole pairs formed on the permanent magnet.

3. The permanent magnet type linear actuator according to claim 1 wherein said permanent magnet of said armature is magnetized into a number of poles arranged along the axis of the permanent magnet at a predetermined pitch, the direction of magnetization being disposed axially of said permanent magnet, and said inductor teeth are provided on the outer and inner surfaces of said core portions in a relation displaced between each other by one half ($\frac{1}{2}$) of the predetermined pitch.

* * * * *